United States Patent
Nema et al.

(10) Patent No.: US 12,199,938 B2
(45) Date of Patent: Jan. 14, 2025

(54) PRIORITIZING COMMUNICATIONS ON A COMMUNICATION DEVICE

(71) Applicant: Stryker Corporation, Kalamazoo, MI (US)

(72) Inventors: Manish Nema, Karnataka (IN); David Holscher, Fort Wayne, IN (US); Arun Mirchandani, Pleasanton, CA (US)

(73) Assignee: Stryker Corporation, Portage, MI (US)

( * ) Notice: Subject to any disclaimer, the term of this patent is extended or adjusted under 35 U.S.C. 154(b) by 297 days.

(21) Appl. No.: 16/987,040

(22) Filed: Aug. 6, 2020

(65) Prior Publication Data

US 2022/0045978 A1 Feb. 10, 2022

(51) Int. Cl.
*H04L 51/226* (2022.01)
*G06Q 10/10* (2023.01)
(Continued)

(52) U.S. Cl.
CPC ......... *H04L 51/226* (2022.05); *G06Q 10/103* (2013.01); *H04L 47/2433* (2013.01); *H04W 8/04* (2013.01)

(58) Field of Classification Search
CPC ..... H04L 51/26; H04L 47/14; H04L 47/2433; H04L 51/226; H04L 51/21; H04L 51/00; H04L 47/2633; G06Q 10/103
See application file for complete search history.

(56) References Cited

U.S. PATENT DOCUMENTS 5,576,952 A 11/1996 Stutman et al.
7,034,691 B1 4/2006 Rapaport et al.
(Continued)

FOREIGN PATENT DOCUMENTS

GB 2517259 A 11/2014
JP 2003-248647 A 9/2003
(Continued)

OTHER PUBLICATIONS

Spok, "Improving Patient Care While Saving Time for Physicians", 10 pages, retrieved on Sep. 28, 2020 from: https://www.spok.com/solutions/healthcare-solutions-role/physicians/#information.
"Integrate Patient Information with Workflow to Deliver Better Patient Care", System Integration and Interoperability, Vocera, 5 pages, retrieved on Sep. 28, 2020 from: https://www.vocera.com/nz/products/integrations-alerts-alarms.
(Continued)

*Primary Examiner* — Nam T Tran
(74) *Attorney, Agent, or Firm* — McDonnell Boehnen Hulbert & Berghoff LLP

(57) ABSTRACT

Embodiments include methods, devices, systems, and non-transitory process-readable storage media for prioritizing communications. Some embodiments may include receiving, by a communication device, a plurality of messages from a server. The communication device may apply a first level ordering to each of the plurality of messages to determine a set of role-based categories, a second level ordering to each of the plurality of messages to assign each of the plurality of messages to one of the role-based categories, and a third level ordering to each of the plurality of messages to rank the plurality of messages within the assigned role-based category based on an assigned priority, a message type, and a timestamp of each of the plurality of messages. The communication device may generate an ordered presentation of the plurality of messages based on the determined rank of the plurality of messages within the assigned role-based category.

18 Claims, 10 Drawing Sheets

(51) Int. Cl.
*H04L 47/2425* (2022.01)
*H04W 8/04* (2009.01)

(56) References Cited

U.S. PATENT DOCUMENTS

| | | | |
|---|---|---|---|
| 9,149,190 | B2 | 10/2015 | Mayoras, Jr. |
| 9,483,529 | B1* | 11/2016 | Pasoi ................... H04L 51/226 |
| 9,652,960 | B2 | 5/2017 | Flinsenberg et al. |
| 9,740,825 | B2 | 8/2017 | Sansale et al. |
| 9,794,210 | B1* | 10/2017 | Cansever ............. H04L 41/026 |
| 10,025,905 | B2 | 8/2018 | Dantsker et al. |
| 10,057,732 | B2 | 8/2018 | Soomro |
| 10,153,994 | B2 | 12/2018 | Mancine et al. |
| 10,567,331 | B1* | 2/2020 | Ledet ................... G06Q 10/103 |
| 11,328,265 | B1* | 5/2022 | Givoly ............... G06Q 10/1097 |
| 2005/0071190 | A1 | 3/2005 | Herger et al. |
| 2006/0235933 | A1* | 10/2006 | Baluja ................. H04L 51/226 |
| | | | 709/207 |
| 2007/0067185 | A1 | 3/2007 | Halsted |
| 2007/0083403 | A1 | 4/2007 | Baldwin et al. |
| 2007/0118601 | A1* | 5/2007 | Pacheco .............. H04L 51/226 |
| | | | 709/206 |
| 2007/0168223 | A1 | 7/2007 | Fors et al. |
| 2008/0114689 | A1 | 5/2008 | Psynik et al. |
| 2009/0313346 | A1* | 12/2009 | Sood ................... H04L 51/226 |
| | | | 709/207 |
| 2012/0136221 | A1 | 5/2012 | Killen et al. |
| 2012/0173631 | A1* | 7/2012 | Yoakum ............... H04L 51/226 |
| | | | 709/206 |
| 2012/0191466 | A1 | 7/2012 | Quint et al. |
| 2012/0290311 | A1 | 11/2012 | Tara et al. |
| 2013/0275524 | A1* | 10/2013 | Gueramy ............. H04L 51/226 |
| | | | 709/206 |
| 2014/0244277 | A1 | 8/2014 | Krishna Rao et al. |
| 2015/0141066 | A1* | 5/2015 | Ramanujam .......... H04L 51/226 |
| | | | 455/466 |
| 2015/0254572 | A1* | 9/2015 | Blohm ................. H04L 51/226 |
| | | | 706/12 |
| 2015/0286787 | A1 | 10/2015 | Chen et al. |
| 2016/0072757 | A1* | 3/2016 | Tolley ................. H04L 51/226 |
| | | | 709/206 |
| 2017/0053552 | A1 | 2/2017 | Zhong et al. |
| 2017/0118601 | A1* | 4/2017 | Li ........................... H04W 4/06 |
| 2017/0134329 | A1* | 5/2017 | Edgar .................. H04L 51/226 |
| 2017/0149716 | A1* | 5/2017 | Mostachetti ............ H04L 51/52 |
| 2017/0178482 | A1 | 6/2017 | Pan et al. |
| 2018/0197638 | A1 | 7/2018 | Blanshard et al. |
| 2018/0324133 | A1* | 11/2018 | Costello ................ H04L 51/226 |
| 2019/0004692 | A1 | 1/2019 | Mason |
| 2019/0156937 | A1 | 5/2019 | Shimomura et al. |
| 2019/0207857 | A1 | 7/2019 | Shelton et al. |
| 2020/0069865 | A1 | 3/2020 | Day et al. |
| 2020/0389551 | A1* | 12/2020 | Vaughn ............. H04M 3/42059 |
| 2021/0105233 | A1* | 4/2021 | Tran .................... H04W 12/084 |

FOREIGN PATENT DOCUMENTS

| | | |
|---|---|---|
| JP | 2019525337 A | 9/2019 |
| KR | 10-2017-0115666 A | 10/2017 |
| KR | 10-2018-0049791 A | 5/2018 |
| WO | 2007058821 A2 | 5/2007 |
| WO | 2010023409 A1 | 3/2010 |
| WO | 2012060899 A2 | 5/2012 |
| WO | 2013134639 A2 | 9/2013 |

OTHER PUBLICATIONS

"Adopting Fast Lane in Clinical Communications" Jun. 2017, Cisco Validated Design, PatientSafe Solutions, 29 pages, retrieved from: https://www.cisco.com/c/dam/en/us/td/docs/solutions/CVD/Healthcare/CVD-Adopting-FastLane-Clinical-Comm-PatientSafe-2017JUN.pdf.

Pathinarupothi et al., "Data to diagnosis in global health: a 3P approach", BMC Medical Informatics and Decision Making, 18, Article No. 78 (Sep. 2018), 37 pages, retrieved from: https://bmcmedinformdecismak.biomedcentral.com/articles/10.1186/s12911-018-0658-y.

Spok, "Drive action by connecting clinical teams with the people and information they need when and where it matters most", Clinical Care, 6 pages, retrieved on Sep. 28, 2020 from: https://www.spok.com/solutions/clinical-alerting-notification/.

Philips, Clinical services, Clinical Alarm Management | Philips Healthcare, 6 pages, retrieved on Sep. 28, 2020 from: https://www.philips.co.in/healthcare/clinical-solutions/alarm-management.

"Improving collaboration in healthcare: 5 ways mobile can help", Published May 30, 2019, by Taylor Mallory Holland, retrieved from: https://insights.samsung.com/2019/05/30/improving-collaboration-in-healthcare-5-ways-mobile-can-help/.

PCT; International Application No. PCT/US2021/044653; International Search Report and Written Opinion; mailed Nov. 24, 2021, 7 pages.

* cited by examiner

PRIORITIZING COMMUNICATIONS ON A COMMUNICATION DEVICE

BACKGROUND

Wireless communication systems are increasingly utilized to facilitate coordination among workgroups in a variety of environments. Wireless communication systems have proven highly efficacious in hospitals and other healthcare environments, because mobile communicators enable rapid communication among doctors, nurses, and other care team staff who sometimes must provide time-critical patient care. Healthcare environments can be busy, information rich, stressful and distracting.

Care providers receive a torrent of information and requests for their attention. Messages, calls, alerts ages, voice calls, mass messages, and public announcements demanding caregiver attention may range from the mundane to time-critical emergencies involving the life or health of patients. While care providers can be equipped with mobile communication devices, typically messages are displayed in chronological order of their arrival or receipt. Not only does this create a burden on users to manually sort through messages, chronological ordering of messages creates a risk that a care provider may miss an important or urgent message.

SUMMARY

Various embodiments provide methods, systems, wireless communication devices, and non-transitory process-readable storage media for enabling a communication device that receives a variety of types of messages to provide an automatically prioritized display of the messages.

Various embodiments may include methods and communication devices configured to perform the methods of for prioritizing communications. Various embodiments may include receiving a plurality of messages from a server, applying a first level ordering to each of the plurality of messages to determine a set of role-based categories, applying a second level ordering to each of the plurality of messages to assign each of the plurality of messages to one of the role-based categories, applying a third level ordering to each of the plurality of messages to rank the plurality of messages within the assigned role-based category based on an assigned priority, a message type, and a timestamp of each of the plurality of messages, and generating an ordered presentation of the plurality of messages based on the determined rank of the plurality of messages within the assigned role-based category.

In some embodiments, the first level ordering may include a role-based set of task-based categories. In some embodiments, the first level ordering may include a role-based set of categories grouped by a patient identifier. In some embodiments, the set of role-based categories may include a hierarchy of the role-based categories, wherein the hierarchy is based on a determined urgency of each of the role-based categories.

In some embodiments, applying the third level ordering to each of the plurality of messages to rank the plurality of messages within the assigned role-based category based on an assigned priority, a message type, and a timestamp of each of the plurality of messages may include applying the third level ordering to each of the plurality of messages to rank the plurality of messages within the assigned role-based category based on a number of recipients to whom the plurality of messages were sent. In some embodiments, applying the third level ordering to each of the plurality of messages to rank the plurality of messages within the assigned role-based category based on an assigned priority, a message type, and a timestamp of each of the plurality of messages may include applying the third level ordering to each of the plurality of messages based on whether one of the plurality of messages is indicated as responded to by a second communication device. In some embodiments, applying the third level ordering to each of the plurality of messages to rank the plurality of messages within the assigned role-based category based on an assigned priority, a message type, and a timestamp of each of the plurality of messages may include applying the third level ordering to each of the plurality of messages based on whether one of the plurality of messages is indicated as read by a second communication device. In some embodiments, applying the third level ordering to each of the plurality of messages to rank the plurality of messages within the assigned role-based category based on an assigned priority, a message type, and a timestamp of each of the plurality of messages may include applying the third level ordering to each of the plurality of messages based on whether a message relates to a successful voice call, a missed voice call, a failed voice call, or a declined voice call.

Some embodiments may further include receiving new information related to one or more of the plurality of messages, re-applying the first level ordering, the second level ordering, and the third level ordering to one or more of the plurality of messages based on the new information, and updating the ordered presentation of the plurality of messages based on the re-applied first level ordering, second level ordering, and third level ordering. Some embodiments may further include receiving another message from the server, applying the first level ordering, the second level ordering, and the third level ordering to each of the plurality of messages, and generating an ordered presentation of the plurality of messages based on the determined rank of the plurality of messages within the assigned role-based category.

Further embodiments include a communication device having a processor configured with processor-executable instructions to perform operations of any of the methods summarized above. Further embodiments include a non-transitory processor-readable medium on which is stored processor-executable instructions configured to cause a processor of a communication device to perform operations of any of the methods summarized above. Further embodiments include a communication device having means for performing functions of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments provide methods, systems, wireless communication devices, and non-transitory process-readable storage media for enabling a communication device that receives a variety of types of messages to provide an automatically prioritized display of the messages. As used herein, the term "messages" refers to any of a variety of messages that the communication device may receive, including phone calls (e.g., voice calls), email, text messages, alerts, notifications, tasks, action assignments, and other information.

Figure 10:
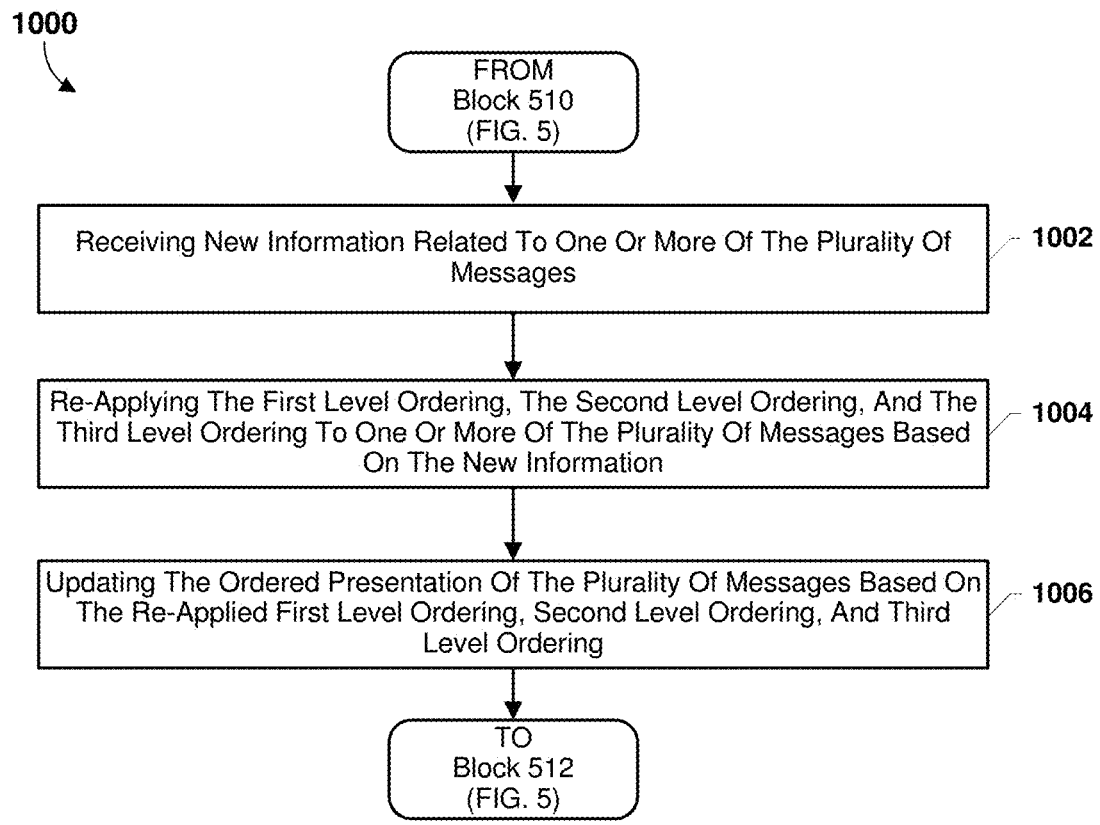

The term "communication device" is used herein to refer to an electronic device equipped with at least a processor and a transceiver configured to support wireless communications with a wireless local area network (WLAN). Examples of communication devices include mobile devices, particularly communicators for use within a hospital or other healthcare environments. In various embodiments, communication devices may be configured with memory or storage as well as networking capabilities, such as network transceiver(s) and antenna(s) configured to establish a WLAN connection with an access point. Communication devices may also include voice communications badge devices, an example of which is illustrated in FIG. 10.

As noted above, healthcare providers work in busy environments and may be bombarded with information and requests for their attention ranging from mundane communications to urgent communications involving the life or health of a patient. Typically, a communication device displays messages in chronological order of their arrival at the communication device. In addition to the burden on users to manually sort these messages, a chronological display of message creates a risk that a user working in a busy and stressful environment may miss an important or urgent message, with negative consequences on patient care and outcomes.

Various embodiments enable a communication device to automatically prioritize and organize messages to provide a dynamic, adaptive, and responsive presentation of messages that enables a caregiver to be aware of the most urgent or important messages.

In some embodiments, the automatic prioritization may be based on a role or task assigned to a user of the communication device. In some embodiments, the communication device may determine a set of role-based categories, and may assign each message to a role-based category. In some embodiments, the communication device may rank messages within each role-based category. In some embodiments, the communication device may be configured to combine messages of various types into a single unified display, sometime referred to herein as a "unified inbox."

In some embodiments, the communication device may re-prioritize and re-order the presentation of messages that are in the inbox based on real-time updates, information, messages, and actions taken by the user (e.g., inputs to the communication device), or by other users (e.g., inputs to other communication devices). Such new information (sometimes referred to herein as "input events") may include new messages, new conversations, new messages in existing conversations, log events from voice calls (such as whether the call was missed, failed, was declined, or was successful), a role or task change of the user, or some action by the user in a particular conversation. A "conversation" refers to one or more messages that are linked according to subject matter or topic (as may be indicated, e.g., by an identifier or metadata associated with the one or more messages). Input events may also include information about a change to a patient condition, which may be sent to the communication device by a patient information alert system. Input events may also include an action by another user (e.g., provided as an input to another communication device). Input events may also include actions or inputs by a user of the communication device taken to a message displayed by the communication device, such as clearing, moving, hiding, unhiding, or filtering a message. In various embodiments, input events trigger an update to a database that stores the messages that re-determines the priority of the messages and may cause the messages to be re-ordered. The communication device may thereby generate a listing of messages that is interactive and dynamically reprioritized in real time, based on real time events and information.

In various embodiments a communication device receiving a plurality of messages from a server may apply various orderings to the messages to determine the order in which messages are presented on the user interface of the device. In some embodiments, the communication device may apply a first level ordering to each of the plurality of messages to determine a set of role-based categories. In some embodiments, the communication device may apply a second level ordering to each of the plurality of messages to assign each of the plurality of messages to one of the role-based categories. In some embodiments, the communication device may apply a third level ordering to each of the plurality of messages to rank the plurality of messages within the assigned role-based category based on an assigned priority, a message type, and a timestamp of each of the plurality of message. The communication device may generate an ordered presentation of the plurality of messages based on the determined rank of the plurality of messages within the assigned role-based category. In some embodiments, the ordered presentation based on the determined rank may place, for example, the highest ranked (and thus highest priority) message in the most prominent location, such as at the top of a list of the messages.

In some embodiments, the set of role-based categories may include a hierarchy of the role-based categories. In some embodiments, the hierarchy may be based on a determined urgency of each of the role-based categories. In some embodiments, the communication device may rank the plurality of messages within the assigned role-based category based on a number of recipients to whom the messages were sent. In some embodiments, the communication device may rank the plurality of messages within the assigned role-based category based on whether one of the plurality of messages is indicated as responded to by a second communication device. In some embodiments, the communication device may rank the plurality of messages within the assigned role-based category based on whether one of the plurality of messages is indicated as read by a second communication device. In some embodiments, since roles of difference users may be different, and the categories available for each user may differ, the relative priority of various messages may be different for each user. So, in some embodiments, the same messages received by different users may be assigned different priorities, and may be placed or ranked in a different order of priority.

In some embodiments, the communication device may receive new information related to one or more of the plurality of messages. Based on the new information, the communication device may re-apply the first level ordering, the second level ordering, and the third level ordering to one or more of the plurality of messages, and may update the ordered presentation of the plurality of messages based on the re-applied first level ordering, second level ordering, and third level ordering. In some embodiments, the communication device may receive another message from the server. Based on the newly received message, the communication device may apply first level ordering, the second level ordering, and the third level ordering to each of the plurality of messages, and may generate an ordered presentation of the plurality of messages (including the new message) based on the determined rank of the plurality of messages within the assigned category.

Various embodiments improve the operation of a communication device and a communication system by providing an adaptive and dynamically prioritized presentation of messages on a communication device. Various embodiments improve the operation of the communication device and the communication system by dynamically ranking and ordering messages within an assigned role-based category to update a presentation of messages on a communication device in real time. Various embodiments improve the operation of the communication device and the communication system by relieving communication device users of the burden manually sorting message on the communication, thereby reducing the risk that the user may miss an urgent or important message. Various implementations may be particularly useful in busy, high-stress environments such as health care environments.

Figure 1:
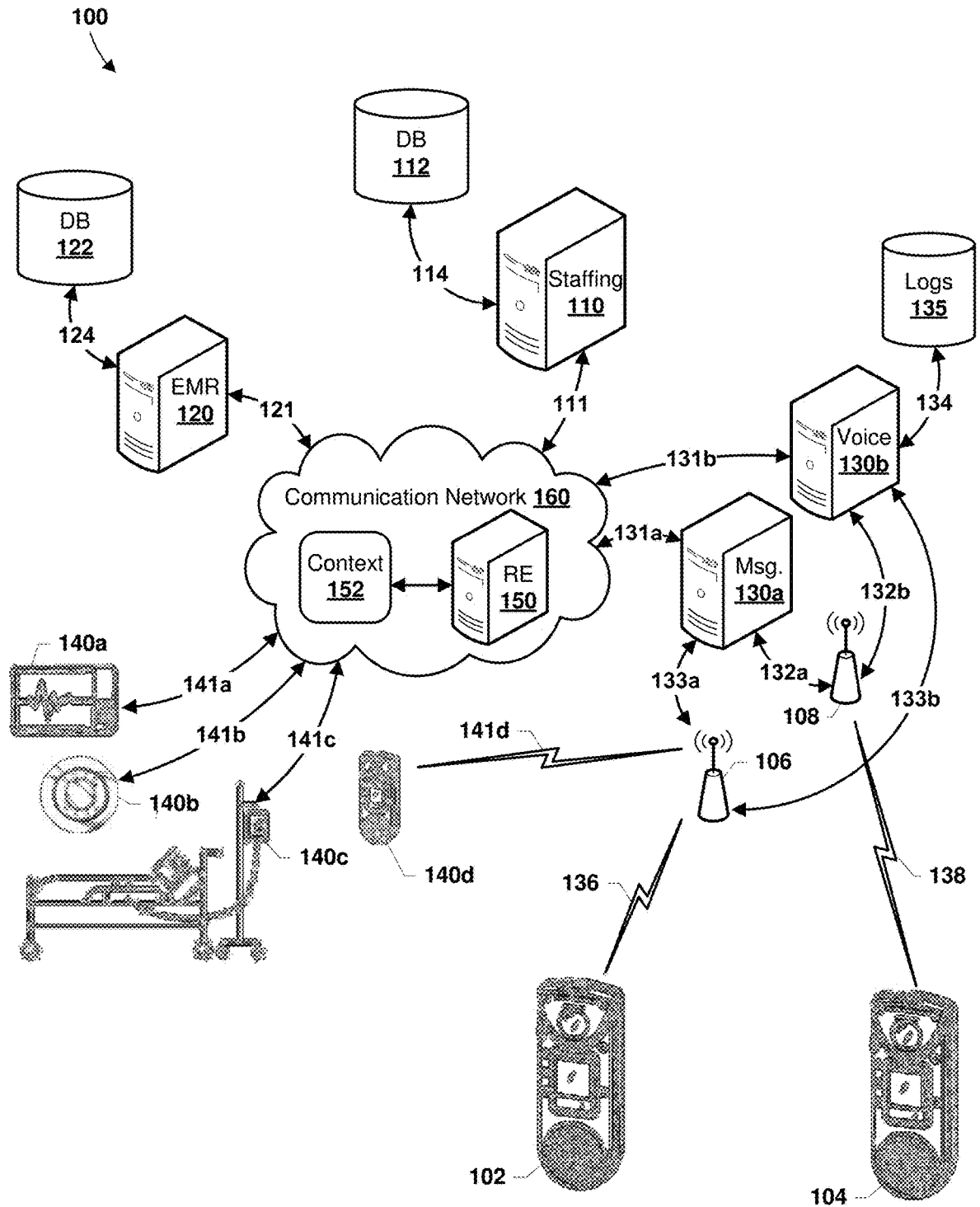
FIG. 1 is a component block diagram of a communication system suitable for use in various embodiments.

FIG. 1 illustrates a communication system 100 suitable for use with the various embodiments. The communication system 100 may include communication devices 102, 104, a staffing server 110, an electronic medical record (EMR) server 120, a messaging server 130a, a voice communications server 130b, one or more sensors/sources 140a-140d, and a rules engine 150. The various elements of the communication system 100 may be configured to communicate over a communication network 160 via wired or wireless communication links 111, 121, 131a, 131b, and 141a-141d. In some embodiments, one or more of the staffing server 110, the EMR server 120, the messaging server 130a, the voice communications server 130b, and the rules engine 150 may be configured as separate devices (e.g., server devices). In some embodiments, one or more of the staffing server 110, the EMR server 120, the messaging server 130a, the voice communications server 130b, and the rules engine 150 may be configured as separate logical services on one server or similar device.

The EMR server 120 may include one or more server computing devices configured to store, update, and transmit information such as patient-based data. The EMR server 120 may communicate over a wired or wireless communication link 124 with a database 122 configured to store data records. Patient-based data may include identifiers or codes indicating an identity of a patient, health care personnel associated with the patient (e.g., physician, specialist, hospitalist, nurse, etc.), patient location information (e.g., room, bed, wing, building), a status of the patient (e.g., discharged, admitted, etc.), and other suitable information.

The EMR server 120 may transmit messages (e.g., in HL7 or another suitable format) including patient-based data via one or more information feeds. In some embodiments, the EMR server 120 may transmit the messages on the occurrence of an event that changes the patient-based data at the EMR server 120. For example, the EMR server 120 may transmit a message that indicates a patient identifier and a room identifier in response to the patient corresponding to the patient identifier being admitted to the hospital and being assigned to a room corresponding to the room identifier.

In some embodiments, the EMR server 120 may be connected to or otherwise may utilize a system capable of sending and receiving HL7 version 2.3 messages (e.g., admission, discharge, transfer (ADT) messages), such as messages that include a role (or "ROL") segment that indicates care team assignment information. The EMR server 120 may transmit information (e.g., in HL7, ADT messaging, or another suitable format) via one or more information feeds (e.g., to the rules engine 150).

The staffing server 110 may be one or more server computing devices configured to at least synchronize care team assignment data from different systems related to the hospital. The staffing server 110 may communicate over a wired or wireless communication link 114 with a database 112 configured to store data records. The staffing server 110 may transmit information (e.g., in HL7, ADT messaging, or another suitable format) via one or more information feeds (e.g., to the rules engine 150).

In some embodiments, the staffing server 110 may be configured to continually receive data from the EMR server 120, the messaging server 130a, the voice communications server 130b, and/or other systems that indicate staffing changes (e.g., to care teams associated with the various patients, locations, and/or shifts of the hospital). For example, the staffing server 110 may receive subscription messages from the voice communications server 130a, 13b indicating when particular nurses of the hospital log-in or out of a shift and/or HL7 messages from the EMR server 120 that indicate when a particular patient's data changes (e.g., assigned to a new bed, room, specialist doctor, etc.). The data records may include, e.g., records related to the various patients admitted to a hospital and/or the various care teams active in the hospital, and may be accessed to obtain a data record indicating the last known nurse, nurse assistant, bed, wing, building, physician, specialist, and hospitalist for a particular patient identifier.

The messaging server 130a may include one or more server computing devices configured to control various messages sent between the communication devices 102, 104 via access points 106, 108. In some embodiments, the messaging server 130a may be configured to control messages sent to the communication devices 102, 104 from the rules engine 150.

The voice communications server 130b may include one or more server computing devices configured to control various voice calls placed between the communication devices 102, 104 via access points 106, 108. In some embodiments, the voice communications server 130b may include a signaling gateway service to facilitate communications between and among the communication devices 102, 104 and the voice communications server 130b, such as login functions, voice call functions, and other suitable functions. In some embodiments, the signaling gateway service may be configured as a separate device (not illustrated).

As noted above, in various embodiments, the messaging server 130*a* and the voice communications server 130*b* may be configured as separate devices, or as logical functions in one device. In some embodiments, the messaging server 130*a* and the voice communications server may transmit information in a suitable format via one or more information feeds (e.g., to the rules engine 150).

In operation, the communication system 100 may include a large number of communication devices and access points, illustrated as communication devices 102, 104, 140*d* and access points 106, 108 for conciseness. The communication devices 102, 104, 140*d* may communicate with an access point 106, 108 over separate wireless communication links 136, 138, 141*d*. The access points 106, 108 may communicate with the voice communications server 130*a*, 130*b* over separate communication links 132*a*, 132*b*, 133*a*, 133*b*. The voice communications server 130*a*, 130*b* may control various messages and voice calls placed between the communication devices 102, 104, 140*d*. The voice communications server 130*a*, 130*b* may communicate over a wired or wireless communication link 134 with a database 135 configured to store logs and other data records.

In some embodiments, the voice communications server 130*b* may be configured to provide information to the rules engine 150 via one or more information feeds. For example, the voice communications server 130 may store, update, and transmit at least shift-based and/or location-based data of the various care team assignments of the hospital. The voice communications server 130 may also store, update, and transmit patient-related information, information related to the facility or environment, and other information. For example, the voice communications server 130 may receive messages from any of the communication devices 102, 104 that indicate users of the communication devices 102, 104, 140*d* have logged-out of or logged-into a shift of working in a care team at the hospital. As another example, the voice communications server 130 may receive a message from a communication device 102, 104, 140*d* regarding the condition of a patient, equipment, a location, an environmental condition, or other suitable information. The voice communications server 130 may transmit information in a suitable format via one or more information feeds (e.g., to the rules engine 150).

The one or more sensors/sources 140*a*-140*d* may include one or more sensor devices to sense information about a patient, an environment, or other suitable information. The one or more sensors/sources 140*a*-140*d* may further include one or more sources information about a patient, an environment, or other suitable information, such as a bed exit monitor, a nurse call button/system, a video surveillance system, or another suitable source). For example, patient monitors 140*a*, 140*c* may include devices configured to monitor one or more patient conditions or vital signs. In some embodiments, the one or more sensors/sources 140*a*-140*d* may transmit information in a suitable format via one or more information feeds to the rules engine 150.

Room sensors 140*b* may be configured to sense and provide information about one or more environmental conditions, or aspects of a person or object to which the sensor is attached (e.g., temperature, humidity, motion, door or window security, ambient light conditions, location, acceleration, orientation, etc.)

Communication devices 140*d* may also function as a source of clinical or call context information, such as identifying users of the devices (i.e., caregivers) in proximity to a patient. In some embodiments, the one or more sensors/sources 140*a*-140*d* may be configured with, or may communication with a device configured with, a processor and a wired or wireless communication capability to communicate sensed information in a suitable format over a wired or wireless communication links 141*a*-141*d*.

The rules engine 150 may include one or more server computing devices configured to receive clinical information via various information feeds from other network elements such as the staffing server 110, the EMR server 120, and the one or more sensors/sources 140*a*-140*d*. In various embodiments, the various network elements (e.g., the staffing server 110, the EMR server 120, and the one or more sensors/sources 140*a*-140*d*) may be configured to send information to the rules engine 150 in an unsolicited manner (e.g., without requiring a query or another message soliciting information).

By receiving information feeds from the other network elements, the rules engine 150 may avoid interfering with or otherwise altering the normal function and efficiency of the other network elements. For example, the rules engine 150 may not alter electronic medical records stored on the EMR server 120, but rather may receive information periodically provided by the EMR server 120 and stored on the rules engine 150.

The rules engine 150 may be configured to associate certain portions or element(s) of the clinical information with one or more event identifiers for use in generating call context information for an event identifier associated with a particular communication request (i.e., call). Further, the rules engine 150 may be configured to provide the call context information to a called communication device 102, 104, e.g., when a communication request is sent to a communication device 102, 104, as further described below.

The communication links 111, 114, 121, 124, 131*a*-134, and 141*a*-141*d* may include wired or wireless communication links. Wired communication links may include, for example, twisted pair cable, coaxial cable or fiber optic cable, or combinations thereof. Wireless communication links may include a radio frequency, microwave, infrared, or other similar signal. Wireless communication links may include a plurality of carrier signals, frequencies, or frequency bands, each of which may include a plurality of logical channels. For example, wireless communication links may be established over a Wi-Fi local area wireless communication network.

Other network elements may be present in a communication system 100 system to facilitate communications are omitted for clarity, including additional access points, processing nodes, routers, gateways, and other network elements, as well as physical and/or wireless data links for carrying signals among the various network elements.

Figure 2:
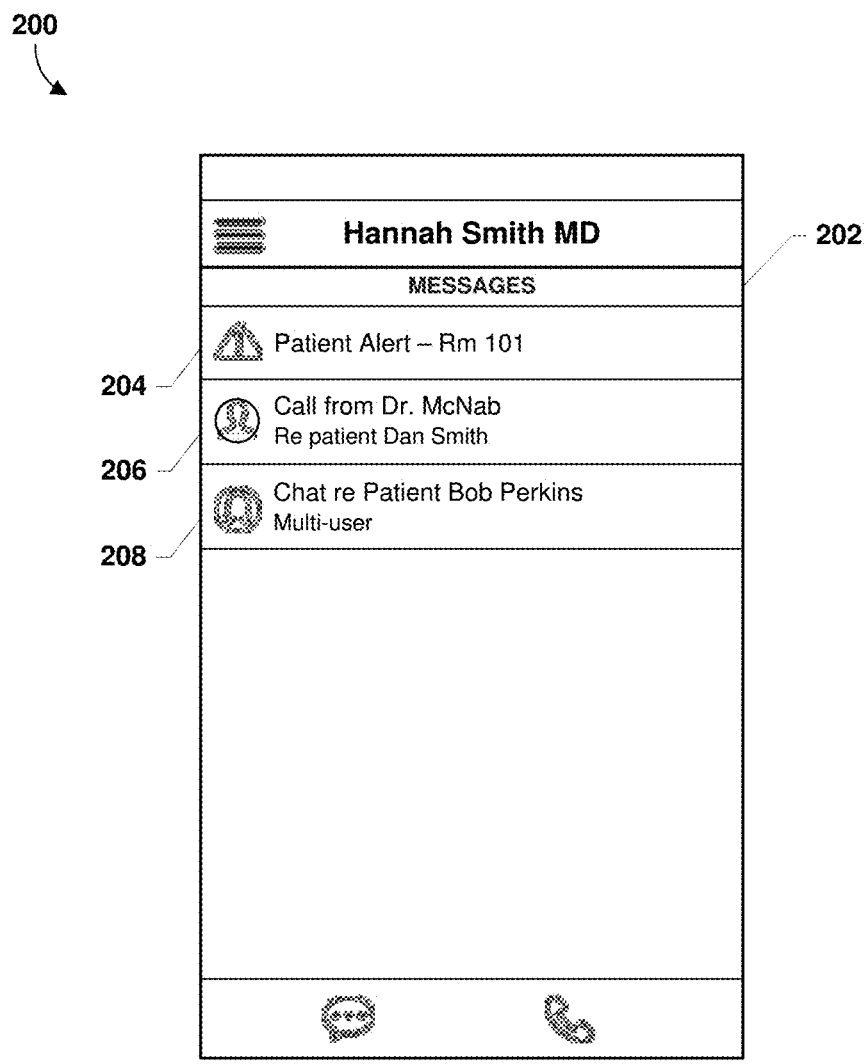
FIGS. 2-4 illustrate operations of a communication device according to some embodiments.
Figure 3:
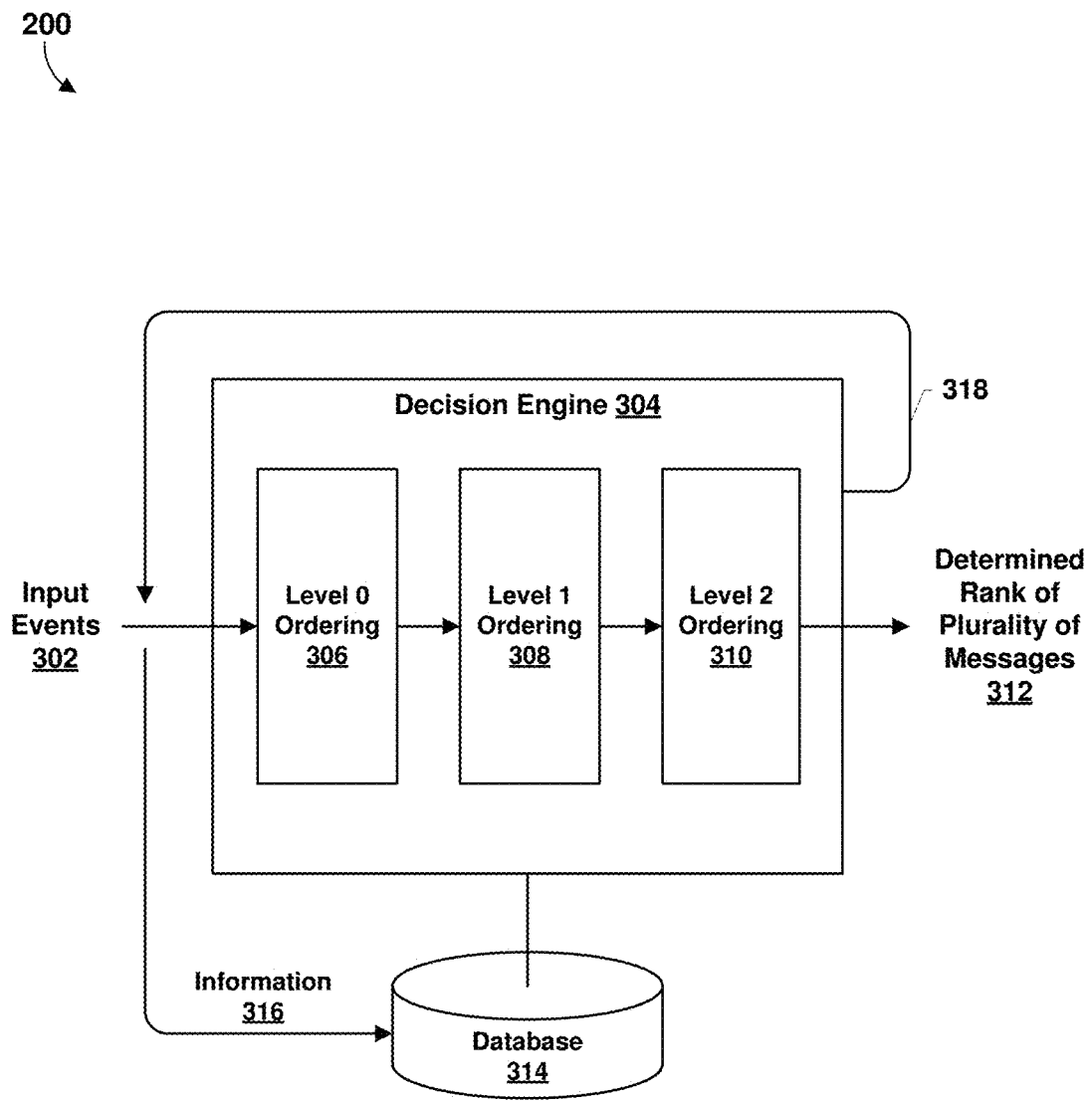
Figure 4:
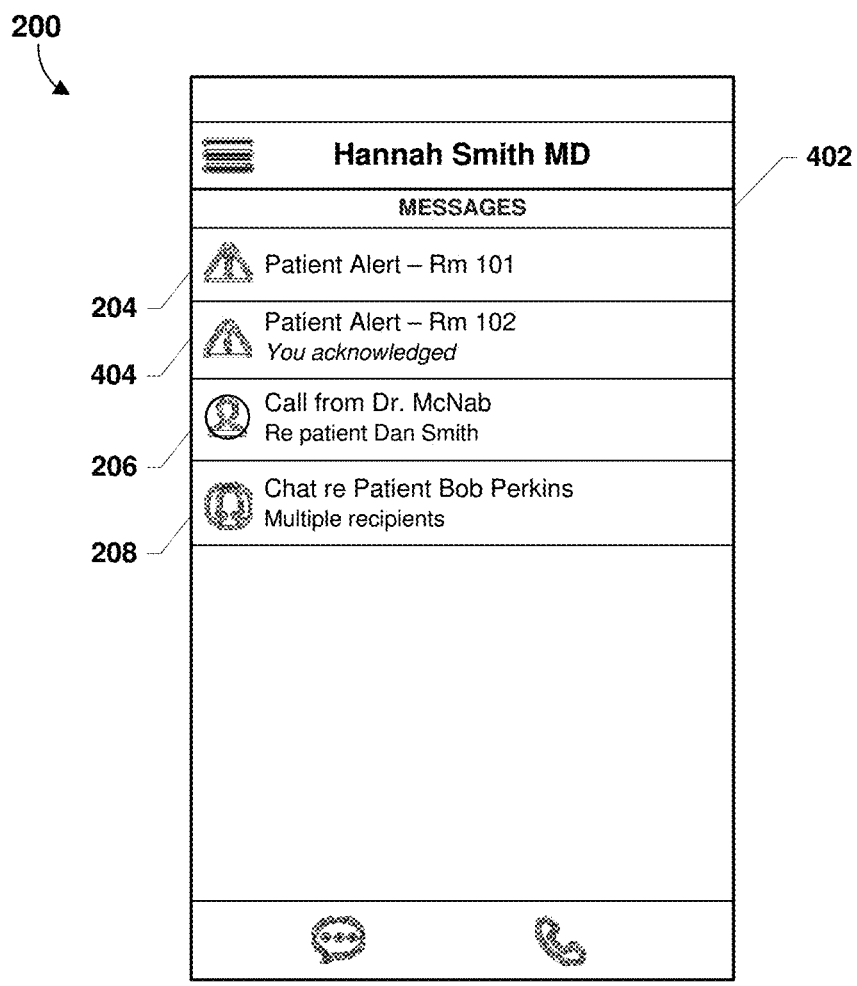

FIGS. 2-4 illustrate operations of a communication device 200 according to some embodiments. With reference to FIGS. 1-4, the illustrated operations may be implemented in hardware components and/or software components of the communication device (e.g., 102, 104), the operation of which may be controlled by one or more processors of the communication device (a "processor").

FIG. 2 illustrates a message screen 202 that may be displayed on the communication device 200. The message screen 202 may provide an ordered presentation of messages 204, 206, and 208. The message 204 may include a patient alert about a patient in room 101. The message 206 may include a call log or call notification about a phone call from Dr. McNab. The message 206 also indicates that it is a patient-related message about patient Dan Smith. The message 208 may include a chat message about patient Bob Perkins. The message 208 also indicates that it is a multi-user message (i.e., that was sent to multiple recipients, and that the chat involves multiple users).

FIG. 3 illustrates a block diagram of the communication device 200 including a decision engine 304 that may be configured to perform operations for prioritizing communications. In some embodiments, the decision engine may include software or hardware of the communication device that may execute on or under the control of a processing device of the communication device 200.

The communication device 200 may receive an input event 302. The input event 302 may include a variety of information, such as a new message, new conversation, an update to an existing conversation, a log events from a voice call, a role or task change of the user, an action by a user in a conversation, include information about a change to a patient condition, an action performed by a user of the communication device such as clearing, moving, hiding, unhiding, or filtering a message, and other information. The processor of the communication device 200 may store information 316 from the input event in a database 314. The database 314 may store data related to messages and input events.

The occurrence, arrival, or receipt of the input event 302 may trigger operations of the decision engine 304. In some embodiments, the decision engine may apply a first level ordering 306 to each of a plurality of messages (such as Level 0 Ordering). In some embodiments, the first ordering may determine a set of role-based categories. For example, a role or a task associated with the user of the communication device 200 may define a group of categories to which messages may be assigned. In some embodiments, the role-based categories may be task-oriented categories (for example, for a nurse or another suitable care provider). In some embodiments, the role-based categories may be patient-oriented categories (for example, for a physician or another suitable care provider). In some embodiments, patient-oriented categories may include sub-ordering by patient. Other examples of roles or tasks that function to define a set of categories are also possible. In various embodiments, each user has different categories defined based on a role or task associated with the user. For example, a user without privileges to view patient-linked events will not have a category of patient-linked events defined for them. In some embodiments, a user's message permissions or prohibitions may be set in a messaging server or another network element of the communication system.

In some embodiments, the decision engine 304 may apply a second level ordering 308 (such as Level 1 Ordering) to the result or output of the first level ordering 306. In some embodiments, the second level ordering may assign each of the plurality of messages to one of the role-based categories. In some embodiments, the role-based categories may include one or more categories such as unaccepted and un-declined alert conversations, alert conversations that have been acknowledged, patient-linked conversations that have been acknowledged, alert conversations that have been accepted or declined, patient-linked conversations that have not been acknowledged, and chat conversations (e.g., one-on-one or multi-user chat conversations). In some embodiments, a list of categories (such as the list in the preceding sentence) may be applied in rank order (for example, in decreasing priority or importance).

In some embodiments, the decision engine 304 may apply a third level ordering 310 (such as Level 2 Ordering) to the result or output of the second level ordering 308 to rank the plurality of messages within the assigned role-based category based on an assigned priority, a message type, and a timestamp of each of the plurality of messages. In some embodiments, the decision engine 304 may determine a priority of a message based on information or metadata associated with the message (for example, high priority, medium priority, or low priority, or any other suitable relative priority indication). In some embodiments, the decision engine 304 may determine a message type for each message. In some embodiments, the message type may indicate a relative importance, urgency, or priority of each message. For example, a message type may indicate (in order of decreasing importance or urgency) whether a message is unread, has been read, whether the message is pending acknowledgement, or has been acknowledged (either by the communication device 200, or by another communication device). In some embodiments, the decision engine 304 may determine a timestamp for each message. In some embodiments, newer message may be given a higher priority than older messages. Based on the assigned priority, message type, and timestamp of each of the plurality of messages, the third level ordering may rank the plurality of messages within the assigned role-based category.

In some embodiments, the decision engine 304 may make one or more determinations about an unread message. For example, the decision engine 304 may prioritize an unread message in a one-to-one conversation over an unread message in a multi-user chat or conversation. Within a one-to-one conversation, the decision engine 304 may determine (or adjust) a priority of a message if the other user has not read the message, or whether the communication device 200 has an unread call log indicating a missed or failed call from another user. Within a multi-user chat, the decision engine 304 may determine (or adjust) a priority of a message if the message has not been read on the communication device 200, or if no other user in the multi-user chat has read the message. In this way, the decision engine 304 may rank the plurality of messages based in part on actions performed, or not performed, on communication devices other than the communication device 200. In some embodiments, the decision engine 304 may make the one or more determinations about an unread message as part of applying the third level ordering 310.

In some embodiments, the decision engine 304 may make one or more determinations about a voice call. In some embodiments, the decision engine 304 may determine (or adjust) a priority of a message associated with a missed call, a failed call, or a declined call. In some embodiments, once either the calling user or the called user makes a successful call, the decision engine 304 may replace this parameter with a most-recent next message (e.g., in a list of messages). In some embodiments, the decision engine 304 may remove the message or other indication of the successful call from the plurality of messages under certain circumstances, such as when the most-recent next message is related to the call. For example, the next message may relate to the same subject matter as the call (e.g., a patient, a task, a change in a vital sign or patient condition, etc.). As another example, the next message may involve the same parties (e.g., calling party, called party, same group of parties, etc.). In some embodiments, the decision engine 304 may make the one or more determinations about the voice call as part of applying the third level ordering 310.

Following the application of the third level ordering 310 the decision engine 304 may output a determined rank of the plurality of messages 312. In some embodiments, based on the determined rank of the plurality of messages 312, the communication device 200 may generate an ordered presentation of the plurality of messages. In some embodiments, the ordered presentation of the plurality of messages may include an ordered presentation within the assigned role-based category of each message. In some embodiments, in operation 318 the decision engine 304 may receive another input event 302 and may repeat the operations described above.

FIG. 4 illustrates an updated message screen 402 that may be displayed on the communication device 200. The updated message screen 402 may provide an ordered presentation of messages 204, 206, and 208 updated to include a new message 404. In some embodiments, the new message 404 may have arrived chronologically after the messages 204-208. However, based on the first level ordering 306, the second level ordering 308, and the third level ordering 310 applied by the decision engine 304, the new message 404 is presented second on the updated message screen 402. For example, new message 404 is a patient alert related to the patient in room 102, which the user has acknowledged (e.g., through the communication device 200). The decision engine 304 has determined that the new message 404 has a relatively lower priority than the patient alert 204, but a relatively higher priority than the patient-related call notification message 206 and the multi-user message 208.

Figure 5:
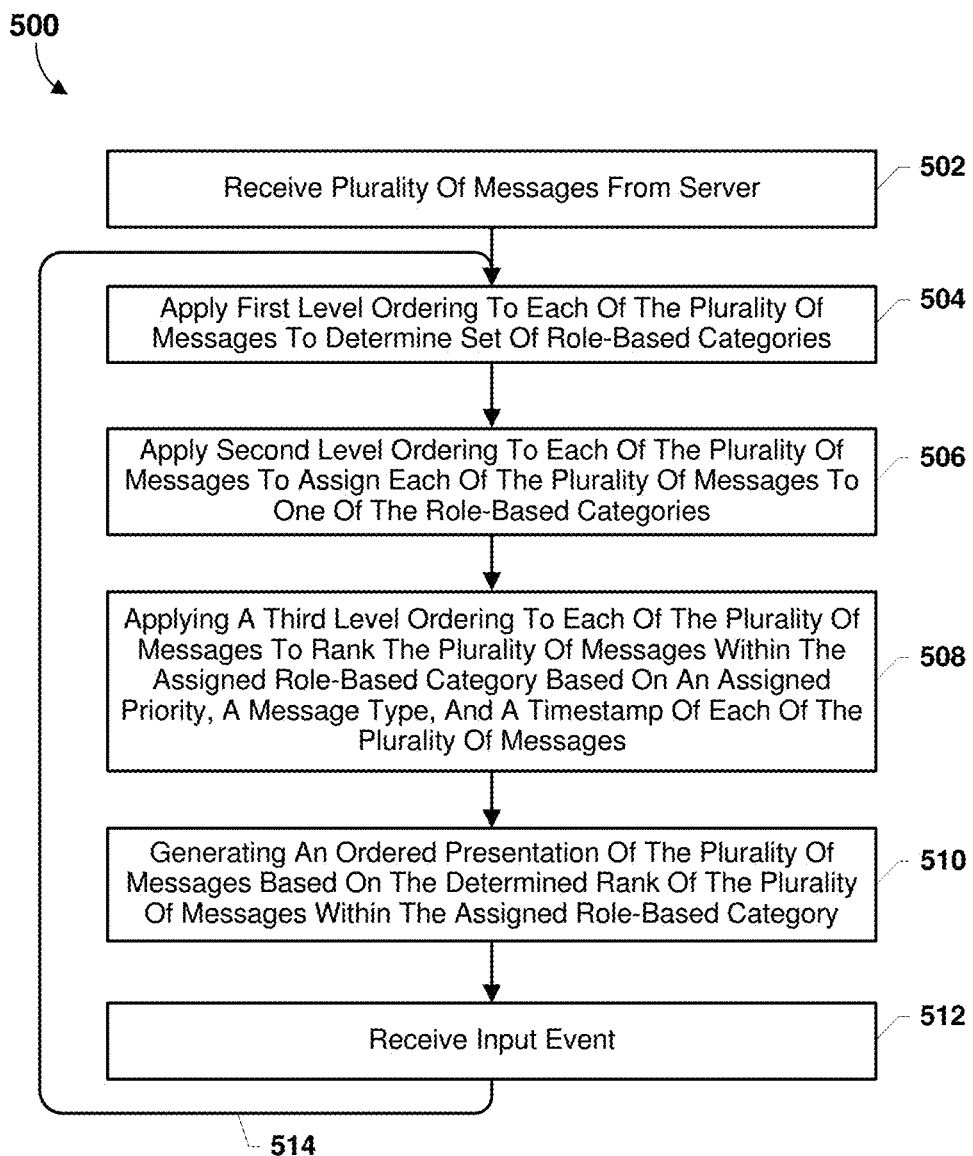
FIG. 5 illustrates a method for prioritizing communications according to various embodiments.

FIG. 5 illustrates a method 500 for prioritizing communications according to various embodiments. With reference to FIGS. 1-5, the method 500 may be implemented in hardware components and/or software components of a communication device (e.g., 102, 104), the operation of which may be controlled by one or more processors of the communication device (a "processor"), using information that may be provided by a decision engine (e.g., the decision engine 304).

In block 502, the processor may receive a plurality of messages from a server. In some embodiments, one or more of the plurality of messages may constitute an input event. In some embodiments, the processor may initially receive messages from the server when the communication device is first initialized or powered on and connects to the communication system. In some embodiments, the processor may receive messages from the server when a user logs on the communication system via the communication device.

In block 504, the processor may apply a first level ordering to each of the plurality of messages to determine a set of role-based categories. For example, the processor may apply the Level 0 ordering (a first level ordering) 306 as illustrated in FIG. 3. In some embodiments, the processor may obtain or receive a role associated with a user of the communication device. In some embodiments, the first level ordering may include a role-based set of task categories. In some embodiments, the first level ordering may include a role-based set of categories grouped by a patient identifier. In some embodiments, the set of role-based categories may include a hierarchy of the role-based categories. In such embodiments, the hierarchy may be based on a determined urgency of each of the role-based categories.

In block 506, the processor may apply a second level ordering to each of the plurality of messages to assign each of the plurality of messages to one of the role-based categories. For example, the processor may apply the Level 1 ordering (a second level ordering) 308 as illustrated in FIG. 3.

In block 508, the processor may apply a third level ordering to each of the plurality of messages to rank the plurality of messages within the assigned role-based category based on an assigned priority, a message type, and a timestamp of each of the plurality of messages. For example, the processor may apply the Level 2 ordering (a third level ordering) 310 as illustrated in FIG. 3.

In block 510, the processor may generate an ordered presentation of the plurality of messages based on the determined rank of the plurality of messages within the assigned role-based category. In some embodiments, the processor may generate the ordered presentation of the plurality of messages based on a relative rank of the messages determined by the processor (e.g., via the decision engine 304).

In block 512, the processor may receive an input event. For example, the processor may receive an input event 302 (which may be a new input). In various embodiments, the arrival, receipt, or occurrence of the input event 302 may trigger the processor to return 514 to the operations of block 504. The processor may proceed to perform the operations of blocks 504-510 as described, including any new information included in the received input event.

FIGS. 6-9 illustrate operations 600-900 that may be performed as part of the method 500 of prioritizing communications. With reference to FIGS. 1-9, the operations 600-900 may be implemented in hardware components and/or software components of a communication device (e.g., 102, 104), the operation of which may be controlled by one or more processors of the communication device (a "processor"), using information that may be provided by a decision engine (e.g., the decision engine 304).

Figure 6:
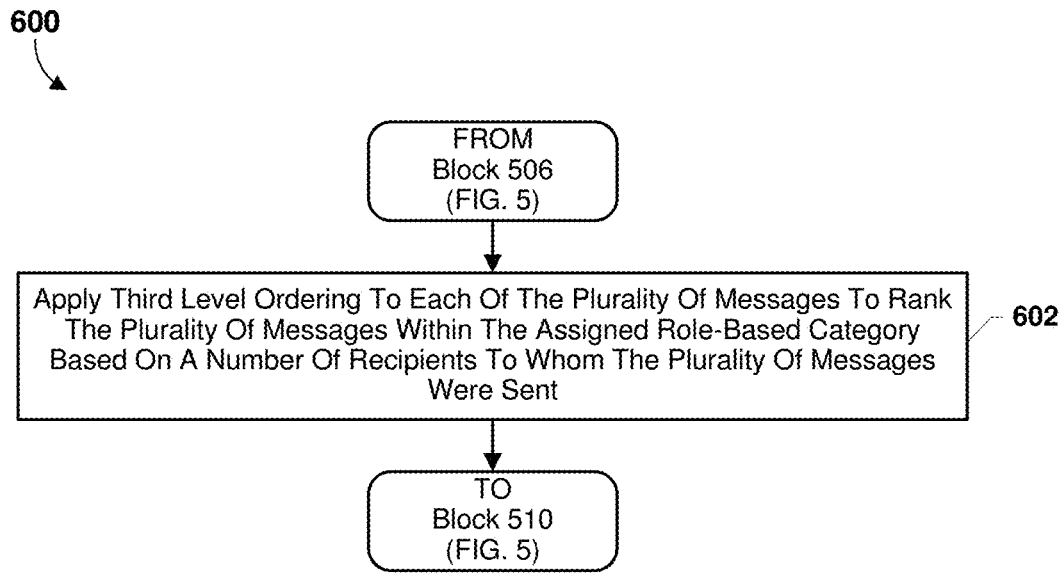
FIGS. 6-10 illustrate operations that may be performed as part of methods of prioritizing communications according to some embodiments.

Referring to FIG. 6, following the operations of block 506 of the method 500 (FIG. 5), the processor may apply the third level ordering to each of the plurality of messages to rank the plurality of messages within the assigned role-based category based on a number of recipients to whom the plurality of messages were sent in block 602. For example, the processor may determine whether the message is a one-to-one communication or conversation, or a multi-user communication or conversation. In some embodiments, the processor may determine a different priority for a one-to-one conversation as compared to a multi-user conversation. In some embodiments, the processor may determine whether the conversation is a mass message or mass alert, for example, if a number of recipients of the message exceeds a threshold, or if the number of recipients includes all or substantially all of the users of the communication system.

The processor may then proceed to perform the operations of block 510 of the method 500 (FIG. 5) as described.

Figure 7:
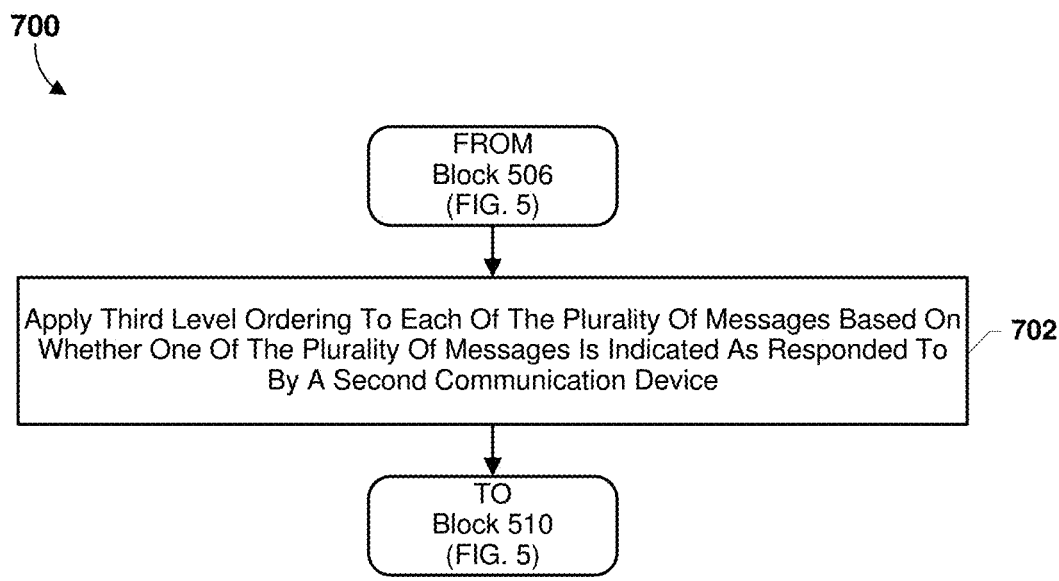

Referring to FIG. 7, following the operations of block 506 of the method 500 (FIG. 5), the processor may apply the third level ordering to each of the plurality of messages based on whether one of the plurality of messages is indicated as responded to by a second communication device in block 702. In various embodiments, actions performed related to a message on or through the second communication device may affect the prioritization of the message on the communication device. For example, the processor may determine whether a message (such as an alert or a task assignment) has been acknowledged, accepted, or declined by another communication device. In some embodiments, the processor may determine whether a message has been cleared, moved, hidden, un-hidden, and/or filtered on another communication device. In some embodiments, the processor may apply the third level ordering to messages based on an action performed the second communication device relative to the message.

The processor may then proceed to perform the operations of block 510 of the method 500 (FIG. 5) as described.

Figure 8:
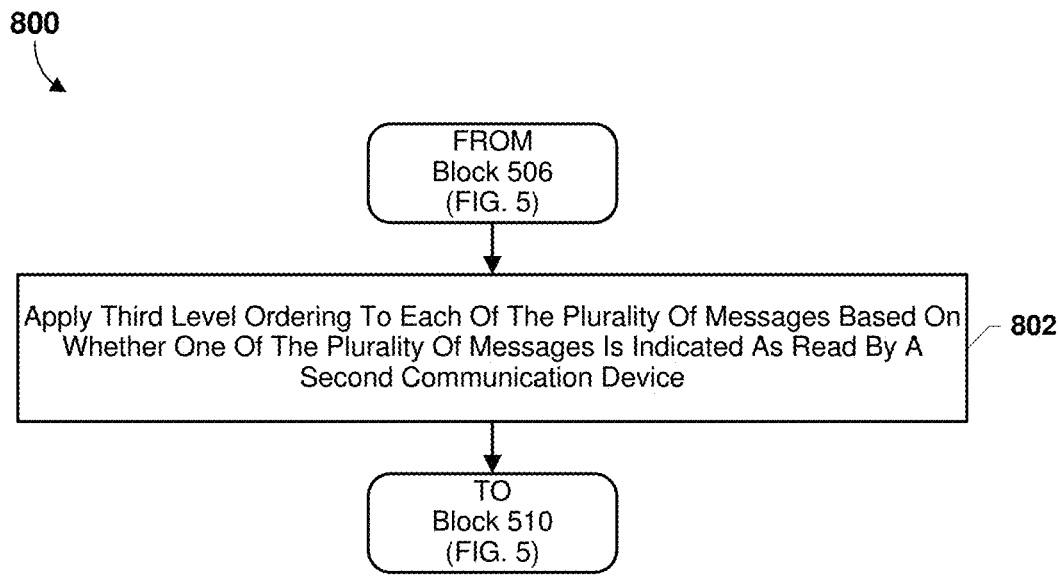

Referring to FIG. 8, following the operations of block 506 (FIG. 5), the processor may apply the third level ordering to each of the plurality of messages based on whether one of the plurality of messages is indicated as read by a second communication device in block 802. As noted above, in various embodiments, actions performed related to a message on or through the second communication device may affect the prioritization of the message on the communication device. For example, the processor may determine whether a message (such as an alert, a task, a chat session, a conversation, or another suitable message) has been read or is unread on another communication device. The other communication device may provide some indication (e.g., to a server device) that the message is read or unread. In some embodiments, the processor may apply the third level ordering to messages based on whether the message is read or unread.

The processor may then proceed to perform the operations of block 510 of the method 500 (FIG. 5) as described.

Figure 9:
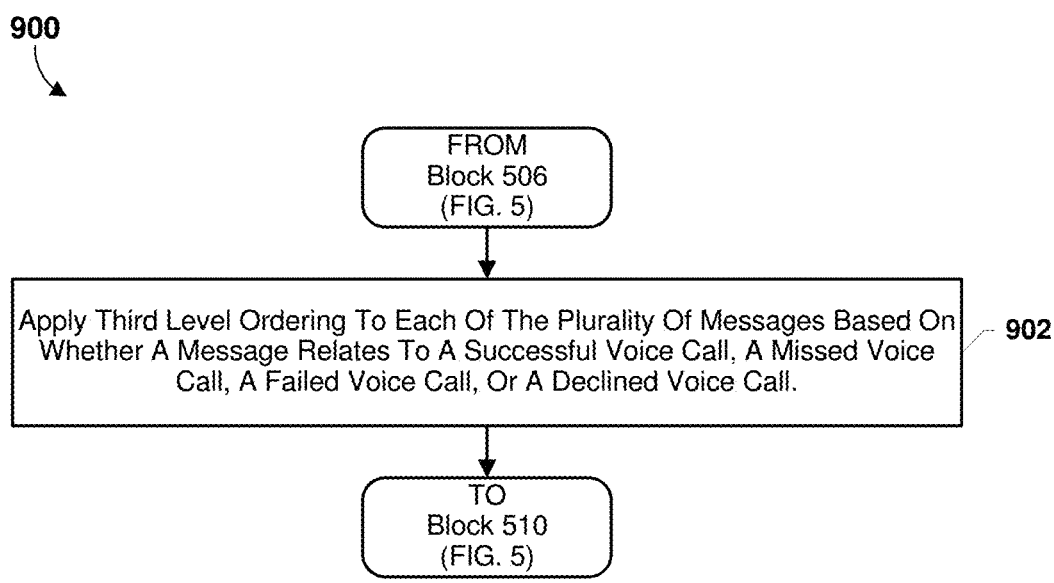

Referring to FIG. 9, following the operations of block 506 of the method 500 (FIG. 5), the processor may apply the third level ordering to each of the plurality of messages based on whether a message relates to a successful voice call, a missed voice call, a failed voice call, or a declined voice call in block 902. In some embodiments, a missed voice call, a failed voice call, or a declined voice call may be assigned a relatively high prioritization and/or ordered relatively high in a listing of the plurality of messages. In some embodiments, once either the calling user or the called user makes a successful call, the processor may replace an indication of the missed voice call, failed voice call, or declined voice call with a most-recent next message (e.g., in a list of messages). In some embodiments, the processor may remove the message or other indication of the successful call from the plurality of messages under certain circumstances, such as when the most-recent next message is related to the call. For example, the next message may relate to the same subject matter as the call (e.g., a patient, a task, a change in a vital sign or patient condition, etc.). As another example, the next message may involve the same parties (e.g., calling party, called party, same group of parties, etc.).

The processor may then proceed to perform the operations of block 510 of the method 500 (FIG. 5) as described.

Referring to FIG. 10, following the operations of block 510 of the method 500 (FIG. 5), the processor may receive new information related to one or more of the plurality of messages in block 1002. For example, the processor may receive an update to a patient condition or new information related to an alert. As another example, the processor may receive an indication that a message status has been changed on another communication device, such as an unread message being read. Other examples of new information related to a message are also possible.

In block 1004, the processor may re-apply the first level ordering, the second level ordering, and the third level ordering to one or more of the plurality of messages based on the new information. For example, the processor may perform the operations of blocks 504, 506, and 508 of the method 500, as described, including the new information.

In block 1006, the processor may update the ordered presentation of the plurality of messages based on the re-applied first level ordering, second level ordering, and third level ordering. In various embodiments, the processor may generate an updated rank of the plurality of message (e.g., 312) based on the new information.

The processor may then proceed to perform the operations of block 512 of the method 500 (FIG. 5) as described.

Figure 11:
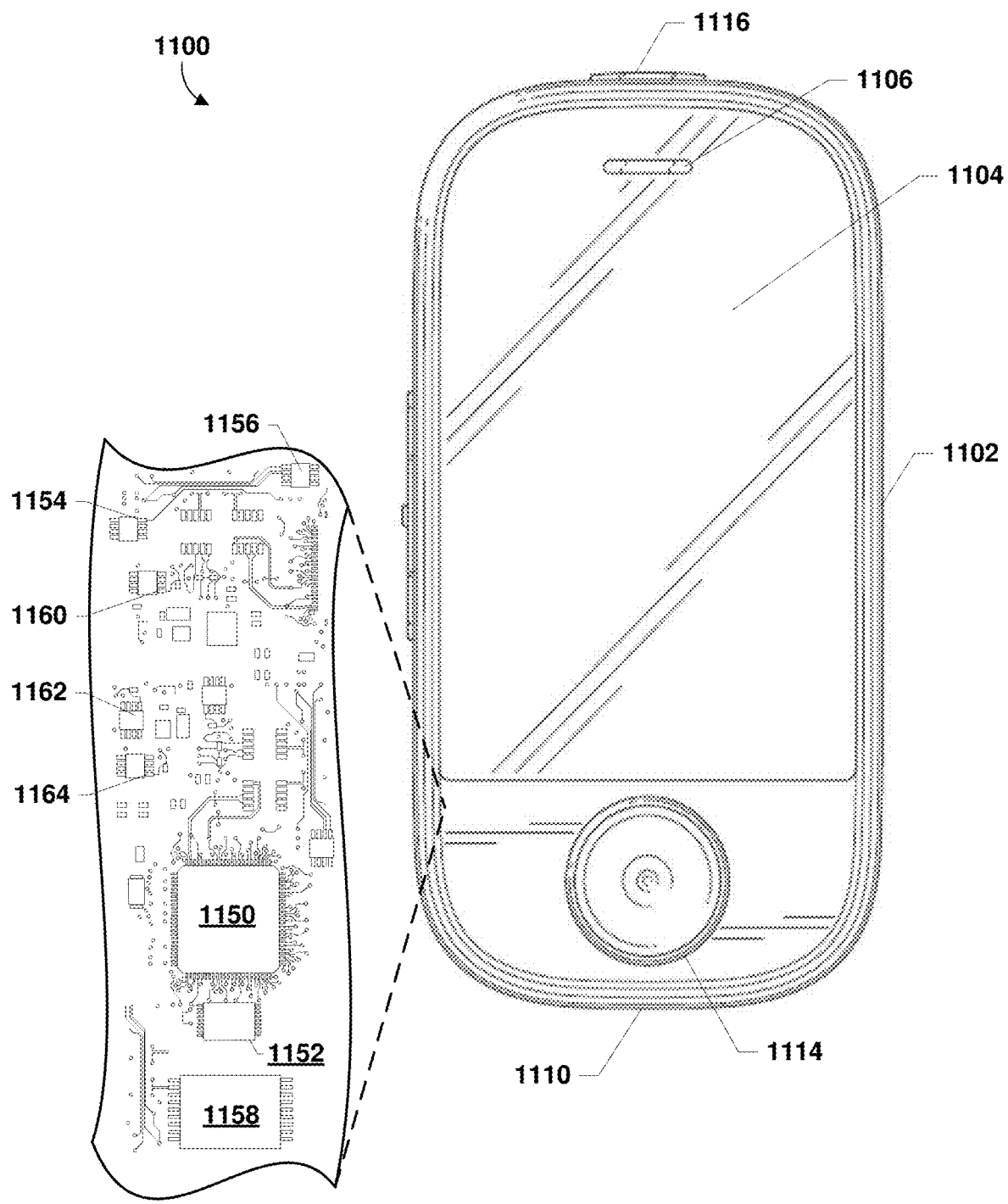
FIG. 11 illustrates a communication device suitable for use in various embodiments.

FIG. 11 illustrates a communication device 1100 suitable for use in various embodiments. With reference to FIGS. 1-11, in some embodiments, the communication device 1100 may include a voice communications badge device. The communication device 1100 may include a housing 1102 that encloses various components. The communication device 1100 may include a microphone 1110, a speaker 1106, and a display device 1104 such as a liquid crystal display (LCD). Various information may be displayed on the display device 1104, such as data for reviewing text messages and pages received by the communication device 1100 and/or data to facilitate the operation of the communication device 1100. The microphone 1110 and speaker 1106 may also be used for voice communications. In some embodiments, the voice communication device 1100 may further include an amplifier that amplifies the signals provided to/from the microphone and speaker.

The communication device 1100 may further include an input device 1114 that permits a user to configure and operate the communication device 1100. In some embodiments, the input device 1114 may be a jog switch that may be a spring-loaded compound-action switch that supports three momentary actions. In such embodiments, the switch may be pressed inwards as an ordinary push button. In some embodiments, the input device 1114 may also be rotated in either direction and/or may be a touch button location in particular location (e.g., on the front of the communication device 1100) that may be pushed or touched to activate the same functions and operations being activated by the jog switch. The communication device 1100 may also include an on/off switch 1116 and a status indicator (e.g., a light emitting diode (LED) that may be capable of displaying one or more different colors to signal the operational status of the communication device 1100, etc.). In some embodiments, the communication device 1100 may optionally include a headset jack that enables the user to plug in an external microphone/speaker headset, such as an ear bud.

Internally, the communication device 1100 may include a central processing unit (CPU) or processor 1150 that controls the operation of the components of the communication device 1100. For example, the processor 1150 may control the operations of the microphone 1110 and the speaker 1106 so that the communication device 1100 may exchange voice communications, commands, and/or responses with remote devices (e.g., a voice communications server, etc.). The communication device 1100 may further include a non-volatile memory device 1152 so that data stored in the communication device 1100 (such as settings, messages, and other data structures) are not lost when the communication device 1100 is powered down. For example, the non-volatile memory device 1152 may be a storage unit or other memory device configured to store at least a factory-assigned a unique physical media access control (MAC) address or unique wireless device address. The communication device 1100 may also include a wireless transceiver 1154 (e.g., an appropriate strength 802.11 transceiver, etc.) and an antenna 1156 that may be used for wireless communications with various access points or with other devices (e.g., other communication devices, etc.). In some embodiments, the antennae 1156 may be built into an exterior clip of the communication device 1100 or may reside completely within the housing 1102 of the communication device 1100.

The communication device 1100 may further include a pager receiver 1160 that operates with the antenna 1156 to receive text messages/pages within the coverage of any global paging service network. The communication device 1100 may further comprise a digital signal processor (DSP)

1162 and an audio codec 1164 for processing incoming speech from the microphone 1110 and for generating the voice signals generated by the speaker 1106. For example, the DSP 1162 and audio codec 1164 may be capable of compressing digital voice data to reduce the amount of digital data used to communicate the voice commands to the server. The communication device 1100 may include a power source 1158, such as a removable, rechargeable battery that may include protection and charge management circuitry to prevent over-charging. For example, the energy source 1158 may be a replaceable, rechargeable lithium polymer or lithium ion battery that fits on or in the housing 1102. The various components may be connected via a bus or other similar linkage or connectivity.

Exemplary descriptions of various voice communications badge devices suitable for use in various embodiments may also be found in commonly-held patent applications, including U.S. Pat. No. 6,892,083 entitled "Voice-Controlled Wireless Communications System and Method," U.S. Pat. No. 8,098,806 entitled "Non-User-Specific Wireless Communication System and Method," and U.S. Design Pat. D679,673, the content of all of which are incorporated herein for descriptions of various communication device components.

Figure 12:
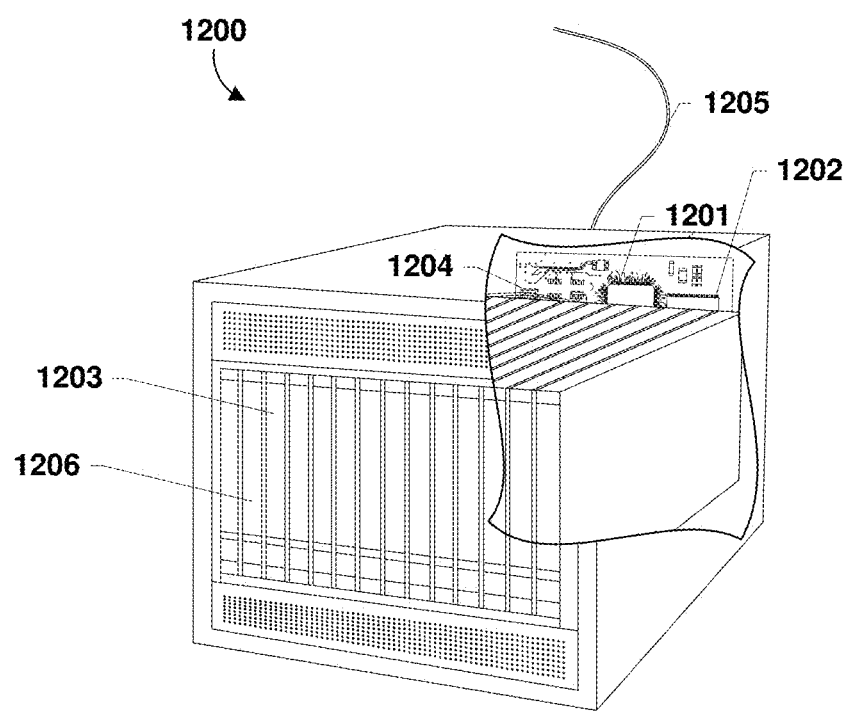
FIG. 12 illustrates a server device suitable for use in various embodiments.

FIG. 12 illustrates a server device 1200 suitable for use in various embodiments. With reference to FIGS. 1-12, various embodiments may employ the server device 1200 as a network element of a communication system (e.g., the communication system 100). Examples of network elements that may be implemented in a server device, or as a logical service in a server device, include the staffing server 120, the EMR server 120, the messaging server 130a, the voice communications server 130b, and the rules engine 150. The server device 1200 may include a processor 1201 coupled to volatile memory 1202 and a large capacity nonvolatile memory, such as a disk drive 1203. The server device 1200 may also include a peripheral memory access device such as a floppy disc drive, compact disc (CD) or digital video disc (DVD) drive 1206 coupled to the processor 1201. The server device 1200 may also include network access ports 1204 (or interfaces) coupled to the processor 1201 for establishing data connections with a network 1205, such as the Internet and/or a local area network coupled to other system computers, including wireless access points (e.g., 106, 108 in FIG. 1) for sending and receiving electromagnetic radiation that may be connected to a wireless communication link. The server device 1200 may include additional access ports, such as USB, Firewire, Thunderbolt, and the like for coupling to peripherals, external memory, or other devices.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the operations of the various embodiments must be performed in the order presented. Accordingly, the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical operations, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The operations of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-Ray Disc® where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method performed by a processor of a first communication device for prioritizing communications, comprising:
   receiving a plurality of messages from a server;
   applying a first level ordering to each of the plurality of messages to determine a set of role-based categories based on a role of a user of the first communication device;
   applying a second level ordering to each of the plurality of messages to assign each of the plurality of messages to one of the role-based categories;
   applying a third level ordering to each of the plurality of messages to rank the plurality of messages within the assigned role-based category based on an assigned priority, a message type, and a timestamp of each of the plurality of messages, wherein applying the third level ordering to each of the plurality of messages to rank the plurality of messages within the assigned role-based category based on an assigned priority, a message type, and a timestamp of each of the plurality of messages comprises applying the third level ordering to each of the plurality of messages to rank the plurality of messages based at least on a given message of the plurality having not been read on a second communication device, wherein the second communication device is different than the first communication device and is used by a different user than the user of the first communication device; and
   generating an ordered presentation of the plurality of messages based on the ranking of the plurality of messages within the assigned role-based category, wherein generating the ordered presentation of the plurality of messages comprises concurrently presenting the plurality of messages in an order based on the ranking.

2. The method of claim 1, wherein the first level ordering comprises a role-based set of task-based categories.

3. The method of claim 1, wherein the first level ordering comprises a role-based set of categories grouped by a patient identifier.

4. The method of claim 1, wherein the set of role-based categories comprises a hierarchy of the role-based categories, wherein the hierarchy is based on a determined urgency of each of the role-based categories.

5. The method of claim 1, further comprising:
   receiving new information related to one or more of the plurality of messages;
   re-applying the first level ordering, the second level ordering, and the third level ordering to one or more of the plurality of messages based on the new information; and
   updating the ordered presentation of the plurality of messages based on the re-applied first level ordering, second level ordering, and third level ordering.

6. The method of claim 1, further comprising:
   newly receiving another message from the server;
   based on the newly received message, applying the first level ordering, the second level ordering, and the third level ordering to each of the plurality of messages and generating a new ordered presentation of the plurality of messages, including the newly received message, based on the ranking of the plurality of messages, including the newly received message, within the assigned role-based category.

7. A first communication device, comprising:
   a processor configured with processor-executable instructions to:
   receive a plurality of messages from a server;
   apply a first level ordering to each of the plurality of messages to determine a set of role-based categories based on a role of a user of the first communication device;
   apply a second level ordering to each of the plurality of messages to assign each of the plurality of messages to one of the role-based categories;
   apply a third level ordering to each of the plurality of messages to rank the plurality of messages within the assigned role-based category based on an assigned priority, a message type, and a timestamp of each of the plurality of messages, wherein applying the third level ordering to each of the plurality of messages based on an assigned priority, a message type, and a timestamp of each of the plurality of messages comprises applying the third level ordering to each of the plurality of messages to rank the plurality of messages based at least on a given message of the plurality having not been read on a second communication device, wherein the second communication device is different than the first communication device and is used by a different user than the user of the first communication device; and
   generate an ordered presentation of the plurality of messages based on the ranking of the plurality of messages within the assigned role-based category, wherein generating the ordered presentation of the plurality of messages comprises concurrently presenting the plurality of messages in an order based on the ranking.

8. The first communication device of claim 7, wherein the processor is further configured with processor-executable instructions such that the first level ordering comprises a role-based set of task-based categories.

9. The first communication device of claim 7, wherein the processor is further configured with processor-executable instructions such that the first level ordering comprises a role-based set of categories grouped by a patient identifier.

10. The first communication device of claim 7, wherein the processor is further configured with processor-executable instructions such that the set of role-based categories comprises a hierarchy of the role-based categories, wherein the hierarchy is based on a determined urgency of each of the role-based categories.

11. The first communication device of claim 7, wherein the processor is further configured with processor-executable instructions to:
    receive new information related to one or more of the plurality of messages;
    re-apply the first level ordering, the second level ordering, and the third level ordering to one or more of the plurality of messages based on the new information; and
    update the ordered presentation of the plurality of messages based on the re-applied first level ordering, second level ordering, and third level ordering.

12. The first communication device of claim 7, wherein the processor is further configured with processor-executable instructions to:
    newly receive another message from the server;
    based on the newly received message, apply the first level ordering, the second level ordering, and the third level ordering to each of the plurality of messages and generate a new ordered presentation of the plurality of messages, including the newly received message, based on the ranking of the plurality of messages, including the newly received message, within the assigned role-based category.

13. A non-transitory processor readable storage medium having stored thereon processor-executable instructions configured to cause a processor of a first communication device to perform operations comprising:
    receiving a plurality of messages from a server;
    applying a first level ordering to each of the plurality of messages to determine a set of role-based categories based on a role of a user of the first communication device;
    applying a second level ordering to each of the plurality of messages to assign each of the plurality of messages to one of the role-based categories;
    applying a third level ordering to each of the plurality of messages to rank the plurality of messages within the assigned role-based category based on an assigned priority, a message type, and a timestamp of each of the plurality of messages, wherein applying the third level ordering to each of the plurality of messages based on an assigned priority, a message type, and a timestamp of each of the plurality of messages comprises applying the third level ordering to each of the plurality of messages to rank the plurality of messages based at least on a given message of the plurality having not been read on a second communication device, wherein the second communication device is different than the first communication device and is used by a different user than the user of the first communication device; and
    generating an ordered presentation of the plurality of messages based on the ranking of the plurality of messages within the assigned role-based category, wherein generating the ordered presentation of the plurality of messages comprises concurrently presenting the plurality of messages in an order based on the ranking.

14. The non-transitory processor readable storage medium of claim 13, wherein the stored processor-executable software instructions are configured to cause the processor of the first communication device to perform operations such that the first level ordering comprises a role-based set of task-based categories.

15. The non-transitory processor readable storage medium of claim 13, wherein the stored processor-executable software instructions are configured to cause the processor of the first communication device to perform operations such that the first level ordering comprises a role-based set of categories grouped by a patient identifier.

16. The non-transitory processor readable storage medium of claim 13, wherein the stored processor-executable software instructions are configured to cause the processor of the first communication device to perform operations such that the set of role-based categories comprises a hierarchy of the role-based categories, wherein the hierarchy is based on a determined urgency of each of the role-based categories.

17. The non-transitory processor readable storage medium of claim 13, wherein the stored processor-executable software instructions are configured to cause the processor of the first communication device to perform operations further comprising:
    receiving new information related to one or more of the plurality of messages;
    re-applying the first level ordering, the second level ordering, and the third level ordering to one or more of the plurality of messages based on the new information; and
    updating the ordered presentation of the plurality of messages based on the re-applied first level ordering, second level ordering, and third level ordering.

18. The non-transitory processor readable storage medium of claim 13, wherein the stored processor-executable software instructions are configured to cause the processor of the first communication device to perform operations further comprising:
    newly receiving another message from the server;
    based on the newly received message, applying the first level ordering, the second level ordering, and the third level ordering to each of the plurality of messages and generating a new ordered presentation of the plurality of messages, including the newly received message, based on the ranking of the plurality of messages, including the newly received message, within the assigned role-based category.

* * * * *